(12) United States Patent
Shenderova et al.

(10) Patent No.: US 7,502,178 B2
(45) Date of Patent: Mar. 10, 2009

(54) MULTIPLE WAVELENGTH AND MULTIPLE FIELD OF VIEW IMAGING DEVICES AND METHODS

(75) Inventors: Olga Alexander Shenderova, Raleigh, NC (US); Gary E. McGuire, Chapel Hill, NC (US); Alexander David Shenderov, Raleigh, NC (US)

(73) Assignee: International Technology Center, Raleigh, NC (US)

( * ) Notice: Subject to any disclaimer, the term of this patent is extended or adjusted under 35 U.S.C. 154(b) by 950 days.

(21) Appl. No.: 10/911,926

(22) Filed: Aug. 5, 2004

(65) Prior Publication Data
US 2005/0046944 A1    Mar. 3, 2005

Related U.S. Application Data

(60) Provisional application No. 60/499,259, filed on Aug. 29, 2003, provisional application No. 60/499,260, filed on Aug. 29, 2003.

(51) Int. Cl.
*G02B 3/08* (2006.01)
*G02B 27/10* (2006.01)
(52) U.S. Cl. ...................................... 359/742; 359/619
(58) Field of Classification Search ......... 359/741–743, 359/738, 618–619
See application file for complete search history.

(56) References Cited

U.S. PATENT DOCUMENTS 6,720,936 B1    4/2004    Koolish et al.
2004/0069957 A1*    4/2004    Menon et al. ............ 250/492.2

OTHER PUBLICATIONS

"Sharper Images by Focusing Soft X-Rays with Photon Sieves", Kipp, et al., Nature, vol. 414, pp. 184-188, Nov. 2001.

\* cited by examiner

*Primary Examiner*—Alicia M Harrington
(74) *Attorney, Agent, or Firm*—Miller Patent Services; Jerry A. Miller

(57) ABSTRACT

An imaging device consistent with one of numerous embodiments has an opaque planar sheet with a plurality of pinholes defining a photon sieve in the sheet, wherein, the photon sieve comprises at least first and second regions. The first region exhibits a first focal length, a first field of view, a first transmissivity, a first resolution and a first wavelength, and the second region exhibiting a second focal length, a second field of view, a second transmissivity, a second resolution and a second wavelength. At least one of the first focal length, the first wavelength, the first transmissivity, the first resolution and the first field of view is different from the second focal length, the second wavelength, the second transmissivity, the second resolution and the second field of view. This abstract is not to be considered limiting, since other embodiments may deviate from the features described in this abstract.

93 Claims, 12 Drawing Sheets
(5 of 12 Drawing Sheet(s) Filed in Color)

250

260

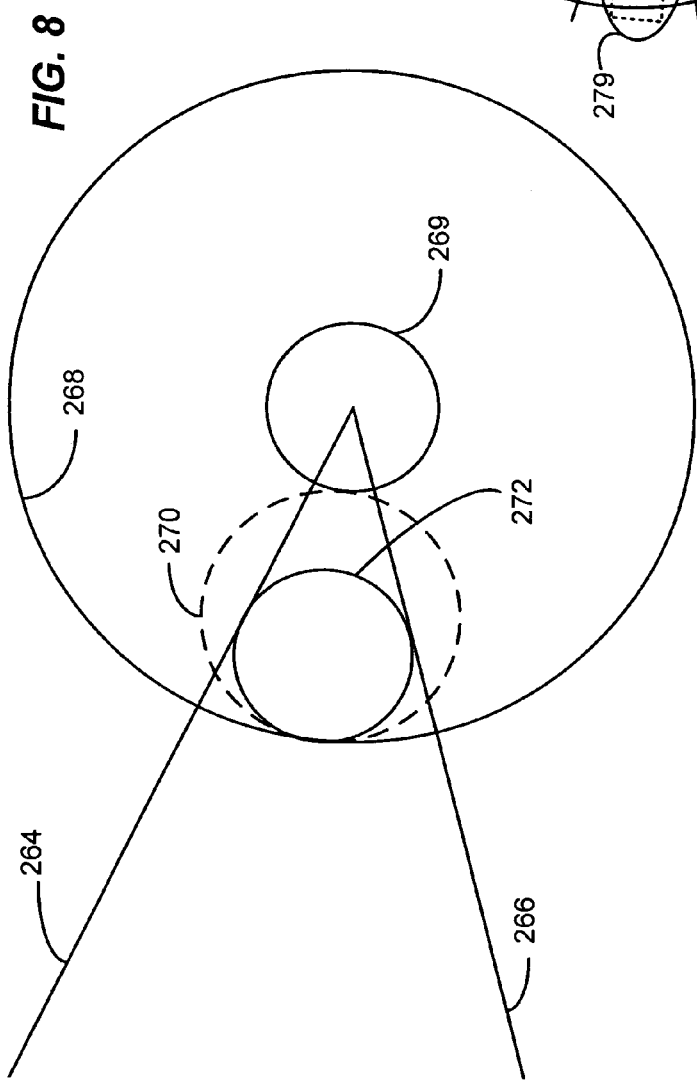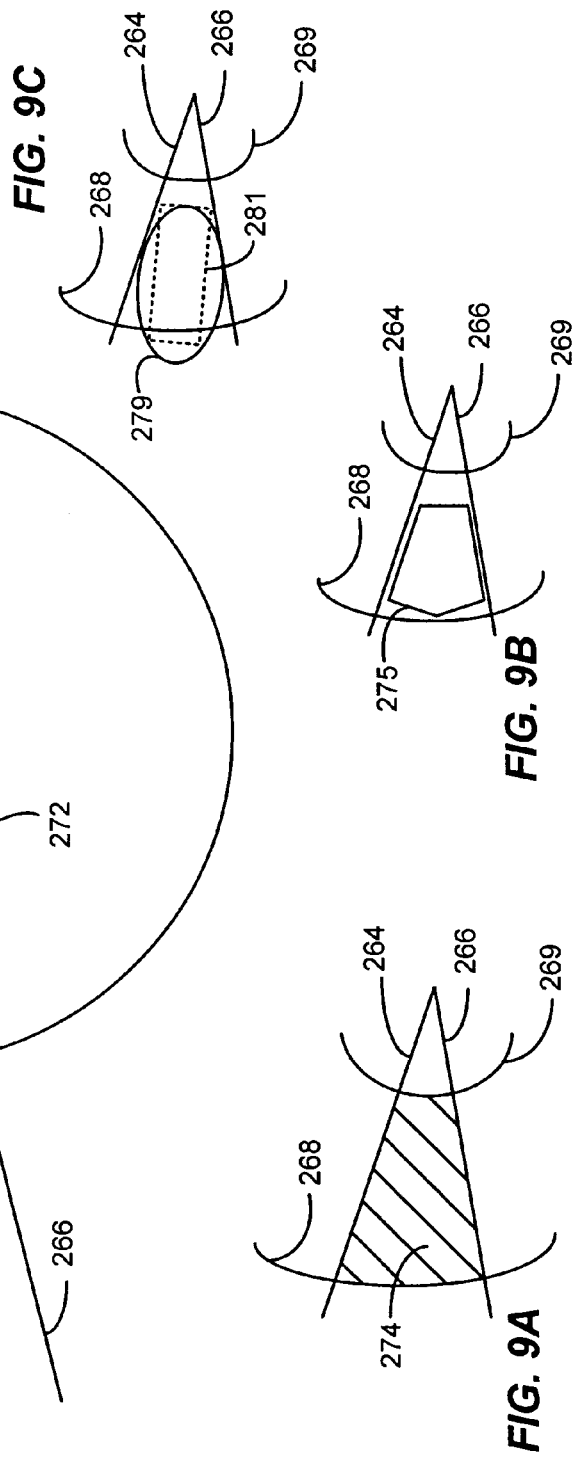

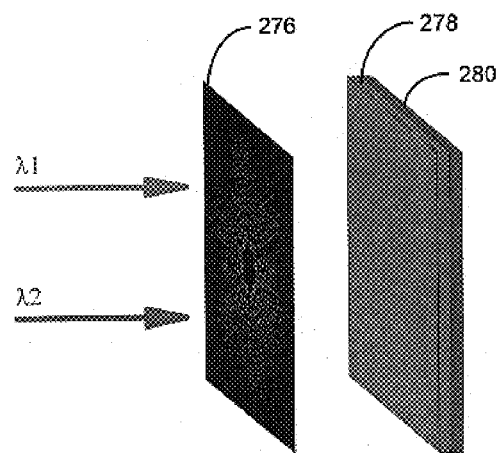
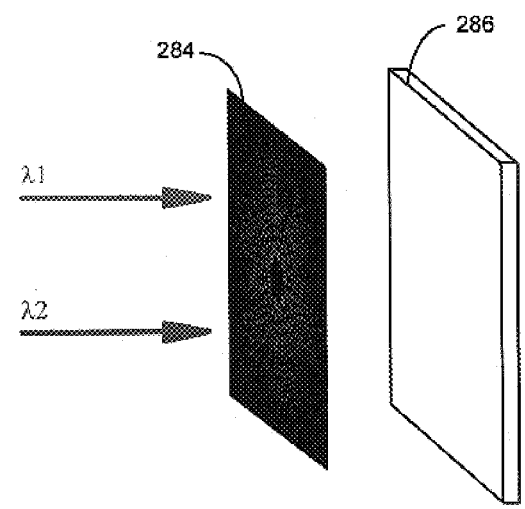
FIG. 10              FIG. 11

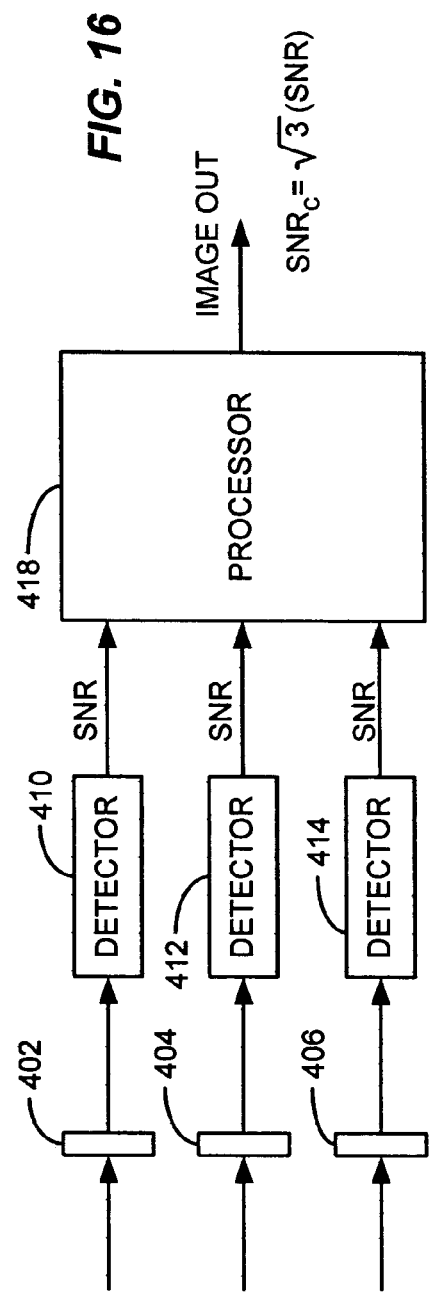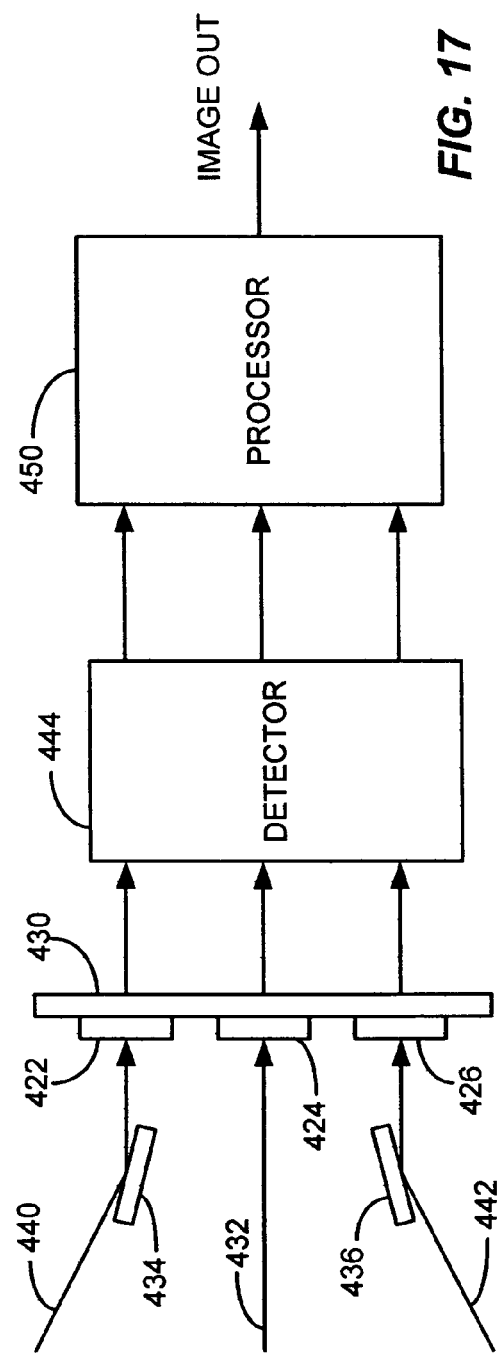

MULTIPLE WAVELENGTH AND MULTIPLE FIELD OF VIEW IMAGING DEVICES AND METHODS

CROSS REFERENCE TO RELATED DOCUMENTS

This application is related to and claims priority benefit of U.S. Provisional Patent Application Ser. No. 60/499,259 filed Aug. 29, 2003 to Shenderova, et al. and U.S. Provisional Patent Application Ser. No. 60/499,260 filed Aug. 29, 2003 to Shenderov et al. which are both hereby incorporated herein by reference.

STATEMENT REGARDING FEDERALLY FUNDED RESEARCH OR DEVELOPMENT

The U.S. Government has a paid-up license to certain embodiments of inventions disclosed herein, and the right in limited circumstances to require the patent owner to license others on reasonable terms as provided for by the terms of subcontract number UF-EIES-0309001-ITC granted under prime grant number N00014-03-1-0418. Inventions disclosed in U.S. provisional application Ser. No. 60/499,259, and certain other inventions claimed herein, were developed outside the scope of the above contracts.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

A Fresnel Zone Plate (FZP), such as FZP 100 shown in FIG. 1, has a set of alternating transmissive and opaque concentric rings that serve as the diffracting elements to focus light. FZPs have been designed to operate at wavelengths that range from the radio wave range to the x-ray range. The ultimate resolution of a FZP is determined by the width of the outermost zone. Fresnel zone plates are attractive alternatives to refractive optics due to savings in size and weight. The main drawbacks for the FZP are the reduced transmission compared to refractive optics, severe chromatic aberration and the presence of secondary maxima (intensity variations in the form of concentric rings) that blur the image at the focal plane.

Photon sieves (PS) are planar imaging elements whose design is based on Fresnel zone plates (FZP), but performance in certain parameters is improved by replacing the transparent ring-shaped zones with an appropriate arrangement of pinholes as illustrated in FIGS. 2 and 3. An ideal lens would have an infinite diameter. An "apodized" lens, such as that of FIG. 3, creates a smooth transition of holes to the outer diameter of the lens to more closely approximate the performance of an infinite lens. FIG. 2 depicts an unapodized PS with 2,722 pinholes that is calculated to have a transparency of 55.8%. FIG. 3 depicts an apodized PS having 818 pinholes that exhibits a transparency of 28.3%. Each photon sieve is designed for a lens diameter of 1.0 mm, Focal Length=10 mm, and λ=650 nm.

Photon sieves use a quasi-random distribution of pinholes in a plane that replaces the conventional zone plate. The pinholes are generally approximately centered within a transparent zone of the underlying Fresnel zone plate. Photon sieves have multiple advantages over both refractive and Fresnel optics. Photon sieves are as compact, lightweight and easy to manufacture as Fresnel zone plates, but they form superior images in terms of sharpness and contrast. Generally, both photon sieves and Fresnel Zone Plates are diffractive devices that have a relatively narrow field of view, lower transmission, greater chromatic aberration, lower contrast and sharpness, compared to refractive devices (e.g., glass or plastic lenses). But photon sieves and Fresnel zone plates are nearly planar in geometry and are generally lower in weight than comparable refractive optics.

BRIEF DESCRIPTION OF THE DRAWINGS

The file of this patent contains at least one drawing executed in color or of a photographic nature. Copies of this patent with color drawing(s) will be provided by the Patent and Trademark Office upon request and payment of the necessary fee.

Certain illustrative embodiments illustrating organization and method of operation, together with objects and advantages may be best understood by reference detailed description that follows taken in conjunction with the accompanying drawings in which:

FIG. 7, which is made up of FIG. 7A, FIG. 7B, FIG. 7C and FIG. 7D comprises a set of illustrations of the effect of use of sub-optimum pinholes in a photon sieve in a manner consistent with certain embodiments of the present invention, wherein.

FIG. 8 illustrates one exemplary sub-optimum pinhole consistent with certain embodiments of the present invention.

FIG. 9, which is made up of FIG. 9A, FIG. 9B and FIG. 9C, illustrates a wedge shaped, pentagon shaped, oval shaped and rectangular pinholes consistent with certain embodiments of the present invention.

FIG. 10 illustrates a dual wavelength photon sieve with dual detectors consistent with certain embodiments of the present invention.

FIG. 11 illustrates a dual wavelength photon sieve with a single detector consistent with certain embodiments of the present invention.

FIG. 16 illustrates a multiple lens and detector system for enhanced signal-to-noise ratio consistent with certain embodiments of the present invention.

FIG. 17 illustrates a wide angle imaging system consistent with certain embodiments of the present invention.

DETAILED DESCRIPTION

Figure 3:
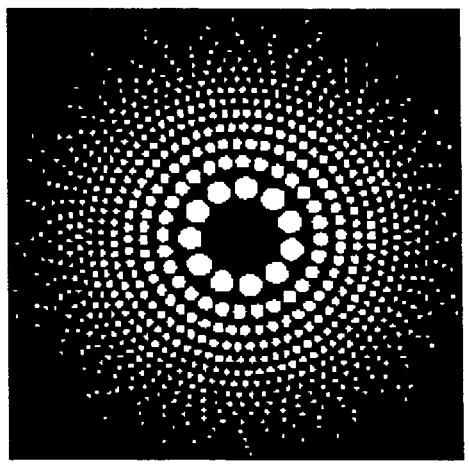
FIG. 3 is an illustration of an apodized photon sieve.
Figure 2:
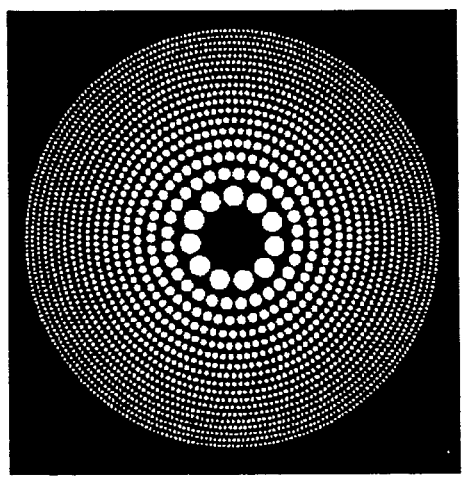
FIG. 2 is an illustration of a unapodized photon sieve.
Figure 1:
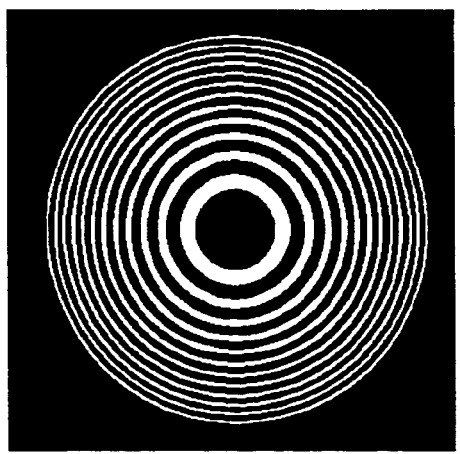
FIG. 1 is an illustration of a Fresnel Zone plate.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are often used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

When the term "detector" is used herein, the term is intended to mean a single detector, multiple detectors and single detector devices that are logically partitioned to operate in a manner equivalent to multiple detectors. Each arrangement is considered equivalent and the same. The term "lens" as used herein can mean either a single lens device, such as a single photon sieve, or can mean an array of such individual lenses. The term "ring" means an approximately circular or elliptical shape. The term "pinhole" as used herein can mean a passageway for radiation at a wavelength through a sheet or substrate that is opaque to the wavelength of interest. Although commonly such pinholes might be circular in shape, the term "pinhole" as used herein is not to be interpreted as limited to circular in shape. The term "concentric" as used herein should be interpreted to mean having the same or approximately the same center or enclosing the same approximately central region. For example, circles or ellipses that do not intersect, but which enclose a common region within the smallest circle or ellipse are considered to be concentric for purposes of this document, without strict need for a single identical center point.

For ease of illustration and understanding, embodiments consistent with the present inventions are described in terms of optical systems, for example, operating in the visible, infrared or near infrared (NIR) spectra. However, those skilled in the art will recognize upon consideration of the present description, that embodiments consistent with the present invention are also useful at other spectra including, but not limited to, radio frequency, X-ray, microwave, gigahertz and terahertz spectra as well as others without limitation. Also, although frequently discussed in terms of an optical lens (suggesting visible light range), the current structures are intended to embrace other uses for photon sieves such as antennas, etc. without limitation at any applicable wavelength of radiation. The term "lens" should be interpreted as inclusive of any of such applications. Additionally, although the present description is presented in terms of diffractive devices, those skilled in the art will appreciate that similar concepts can be equivalently developed for reflective photon sieve devices, without departing from certain embodiments consistent with the present invention. In such reflective devices, the pinholes are generally replaced or represented by spots that are reflective at the wavelength of interest (e.g., mirrors for visible light) rather than being transmissive at the wavelength of interest.

In accordance with certain embodiments, device such as Fresnel lenses, Fresnel zone plates and photon sieves, can be designed which are either symmetrical or asymmetrical with respect to their optical axes (or imaging axes). In particular, for planar optics, such as planar zone plates and photon sieves, the angles between the optical axes of devices consistent with the present invention and their planes can be made arbitrary rather than right.

Planar Fresnel zone plate layout can be calculated so as to maximize the amount of radiation coming from an on-axis source to the focus in phase, and minimize out-of-phase contributions. To do that, the plane is divided into approximately concentric rings, called Fresnel zones, with $\lambda/2$ phase shift between radiation paths from the source to the focus through adjacent ring boundaries. As will be seen later, the planar nature of such optical elements and their associated planar methods of fabrication facilitates easy alignment of optics with other system elements, such as additional optics, housings and/or detectors.

A similar approach can be utilized to compute the Fresnel zones for an off-axis object. These zones can be used to determine the location of the arcs or rings of pinholes used in a photon sieve. For example, let us consider an infinite-finite conjugate system (object at infinity at an angle a, focus at finite focal length f), shown in FIG. 4.

Figure 4:
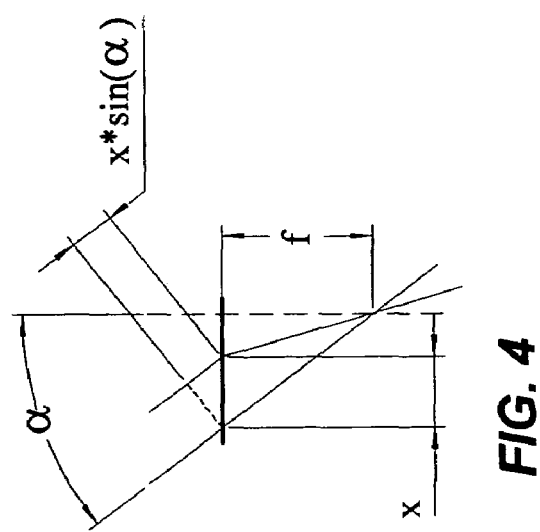
FIG. 4 is an illustration of the parameters used in calculation of an elliptical photon sieve consistent with certain embodiments of the present invention.

The lengths of the two optical paths shown in FIG. 4 can be expressed as:

$$\sqrt{f^2 + (f \cdot tg\alpha - x)^2 + y^2} + x\sin\alpha - \frac{f}{\cos\alpha} = \frac{\lambda \Delta\varphi}{2\pi}$$

where Δφ is the phase difference accumulated along the paths and λ is the wavelength of the radiation. The origin is at the intersection of the straight line between the object and focus with the plane of the optic. Here, the X axis is pointing to the right, and the Y axis is perpendicular to the plane FIG. 4. To define the Fresnel zones, choose Δφ=πn. Then, the curves of equal phase are ellipses with centers at:

$x_0 = -n\lambda tg\alpha/2, y_0 = 0,$ elongated along the X axis. The major and minor semi-axes $\alpha_x$ and $\alpha_y$ are given by:

$$a_x = \frac{1}{\cos\alpha}\sqrt{\left(\frac{n\lambda}{2}\right)^2 + \frac{n\lambda f}{\cos\alpha}}, \, a_y = \sqrt{\left(\frac{n\lambda}{2}\right)^2 + \frac{n\lambda f}{\cos\alpha}};$$

Figure 5:
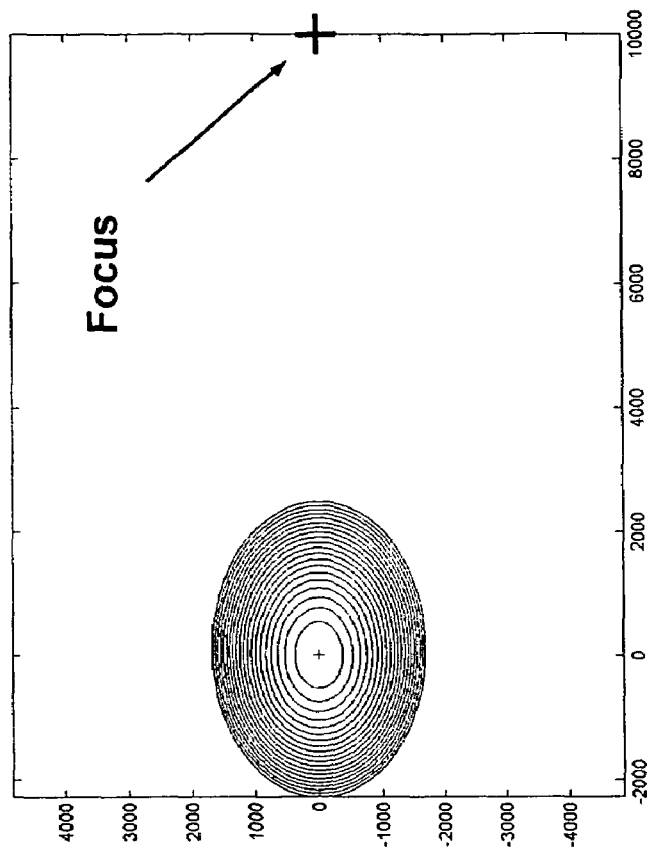
FIG. 5 is a graph depicting the Fresnel zones of an elliptical photon sieve consistent with certain embodiments of the present invention.

The example of FIG. 5 shows the first 20 Fresnel zones for a design with the following parameters: 45° inclination of optical axis, 10 mm focal length, 10 µm design wavelength (the dimensions in FIG. 5 are in µm). Those skilled in the art can calculate positions of Fresnel zones in this way for other optics. By appropriately placing pinholes in the Fresnel zones defined as above, a photon sieve results. For photon sieves of conventional design, the pinholes are circular with a diameter of the width of the Fresnel zone into which it is placed, but this should not be considered limiting as will be discussed.

A photon sieve designed according to the example given above can use conventional circular pinholes, however, the invention in certain embodiments is not limited to circular pinholes. For example, in the above example, elliptical pinholes may be used to provide better conformity to the geometry of the Fresnel zones. In other embodiments, other geometries besides circular or elliptical pinholes can be used. For example, it may be advantageous to use square, rectangular, hexagonal, octagonal, or other piecewise segmented approximations of circular, elliptical or other shaped pinholes. In certain embodiments, the use of such piecewise segmented pinholes have advantages in layout since curves are often approximated in computers by use of short line segments. Moreover, other shapes of pinholes may be advantageous in other embodiments.

Those skilled in the art will recognize, upon consideration of this teaching, that changing the geometry of the pinholes from conventional circular geometry will likely affect the performance of the photon sieve in some manner. The type and degree of effect of various geometries has not been fully explored except to note that larger surface area geometries will pass more radiation than smaller surface areas. The other aberrations that may occur can be explored mathematically or experimentally for a given geometry in order to determine if any adverse effects occur and whether potential advantages derived from particular pinhole geometry outweighs the adverse effects experienced for a given application and the parameters that are significant to that application.

Fresnel zone plates and photon sieves can be formed by any number of known processes including, but not limited to, photographic and lithographic processes, as well as various layering, etching, etching and cutting processes. In each process, an arrangement of opaque areas and transmissive areas (i.e., rings or pinholes) are provided in an opaque sheet or substrate. Many fabrication processes are available and equivalent. For example, a clear substrate can be used with an opaque layer applied to one or both surfaces into which pinholes are formed. Equivalently, the substrate may be opaque and pinholes can be formed (e.g., drilled, punched, etched, cut, etc.) in the substrate itself. The pinholes need not be actual holes, but are simply transparent regions (i.e., transmissive at the wavelength of interest) formed in an opaque sheet (opaque to absorb radiation at the wavelength of interest). Thus, for example, when a substrate is referred to as having a photon sieve situated on a surface thereof, it should be interpreted to encompass any suitable fabrication technique, including those in which the substrate itself forms the opaque areas. Many other variations are possible.

In accordance with certain embodiments consistent with the present invention, the chromatic aberration that is normally present in a PS can be virtually or completely compensated for at a chosen set of wavelengths. Namely, in accordance with certain embodiments, the photon sieve can be divided into sectors or regions (these terms are used synonymously to mean any area or subset of the photon sieve that is designed to operate as a lens in and of itself), with the pinhole pattern in each region optimized for a certain wavelength. Photon sieves that are divided into regions with each region having at least one characteristic that differs from at least one other region may be generically referred to as "segmented photon sieves". Selective transmission can be obtained by appropriate design of each region (and can be complemented by use of filters) with appropriate transmission bands that overlay each or some of the sectors. The widths of the regions, geometry of the regions, and the total area of the pinholes in each region, can be adjusted to obtain the spectral transmission characteristics that are desired when designing a system that focuses on a known detector or detectors at one or more focal lengths. This allows one to adjust the spectral properties of the optics and the detector so that the complete system has the desired spectral sensitivity and other properties. Any number of shapes can potentially be used for the regions. In certain of the current exemplary embodiments, wedge shaped or pie-slice shaped regions are used, but this should not be considered limiting. A "pie-slice shaped region" is intended to mean any region that is approximately bounded by lines on two sides and a curve (e.g., a circular or elliptical arc) at the third (such curve generally representing an outer boundary of the photon sieve). Any suitable shape which is a subset of the entire photon sieve and which behaves as a lens in and of itself can be used without limitation.

Figure 6:
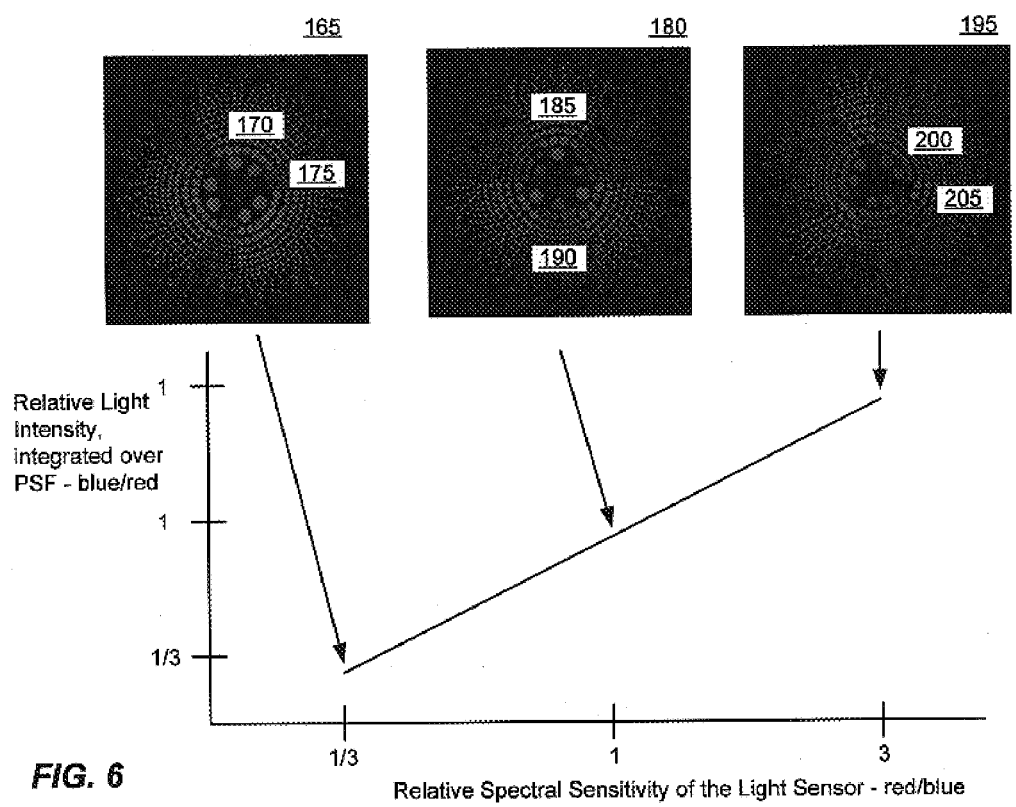
FIG. 6 illustrates change in spectral sensitivity and point spread function for three multi-chromatic photon sieves consistent with certain embodiments of the present invention.

FIG. 6 illustrates one embodiment of this concept of using photon sieves of three similar designs, each having six pie-slice shaped sectors or regions of varying sizes. Alternating sectors are designed for blue and red wavelength radiation. Of course, the present invention should not be limited to six sectors since more or fewer could be used without limitation. Moreover, the distribution of the sectors can be varied from that shown.

The exemplary Photon Sieve 165 has six regions or sectors. The three relatively larger sectors such as 170 are designed for red wavelength radiation at a given focal length (and can be made further selective by use of filtering with a filter that selectively transmits red light ("red filters") on either side of the photon sieve), and the three relatively smaller sectors such as 175 are designed for blue wavelength radiation at a given focal length (and can be made further selective by use of filtering with a filter that selectively transmits blue light ("blue filters") on either side of the photon sieve). The two focal lengths and other characteristics can be the same or different, without limitation. (In this example, and the others presented herein, the wavelengths chosen for the examples are generally visible light wavelengths are arbitrary and exemplary, and should not be considered limiting. The present invention can be applied to process radiation at wavelengths above and below those of visible radiation without limitation. Moreover, certain preferred embodiments are implemented at microwave frequencies.)

In this example, the sectors ("red sectors") such as 170 occupy ¾ of the surface area of PS 165 and are designed for red wavelength light. This embodiment transmits more red light than blue light. In this example, the ratio of red light intensity transmitted to blue light intensity transmitted is about one third that of PS 180 wherein the "red sectors" such as 185 are approximately the same as the "blue sectors" 190. Similarly, PS 195, with "blue sectors" 200 which are three times larger than the area of "red sectors" 205, shows a corresponding increase in relative radiation intensity of blue/red radiation (about three times that of PS 180).

In all cases in the above example, the relative radiation intensity shown graphically is integrated over the point spread function (PSF). The changes in the photon sieve geometry also affect the relative spectral sensitivity of red versus blue radiation with greater sensitivity to red radiation from PS 165 versus greater sensitivity to blue radiation in PS 195. The above, of course assumes that if red and blue filters are used as described above, identical transmission is achieved of blue radiation through the blue filter as red radiation through the red filter. By adjusting the geometry of the sectors of the photon sieve, the spectral sensitivity can be adjusted so that multiple wavelengths can be processed through a single PS. Moreover, the above arrangement can be designed to process one or multiple wavelengths of radiation to focus at one or multiple focal lengths and/or to achieve one or more fields of view, transmissivity, or resolution.

As previously noted, photon sieves are as compact, lightweight and about as easy to manufacture as Fresnel zone plates, but they form superior images in terms of sharpness and contrast. However, both photon sieves and Fresnel zone plates suffer from limited radiation transmission, since the opaque zones transmit no radiation. In segmented photon sieves such as the poly-chromatic device just described, one or more innermost zones in each sector may be too narrow to fit a "standard-size" pinhole (calculated as a percentage of the underlying Fresnel zone's width—A standard size pinhole has a diameter of 100% of the width of the Fresnel zone width, however, larger sizes may also be used as will be discussed later.). In that case, in certain embodiments, smaller-than-standard or sub-optimal pinholes can be used for these zones in each or some of the sectors as depicted in FIG. 7.

Thus, a diffractive imaging device consistent with certain embodiments has an opaque planar sheet with a first arrangement of pinholes in the sheet, the pinholes lying approximately along first arcs of concentric Fresnel zones rings. The position of the first arcs are determined by Fresnel diffraction to focus a first wavelength, with a first transmissivity and a first resolution, at a first focal length over a first field of view. A second arrangement of pinholes is provided in the sheet, with the pinholes lying approximately along second arcs of concentric Fresnel zone concentric rings. The position of the second arcs is determined by Fresnel diffraction to focus a second wavelength, with a second transmissivity and a second resolution, at a second focal length over a second field of view. At least one of the first focal length, the first wavelength, the first transmissivity, the first resolution and the first field of view is different from the second focal length, the second wavelength, the second transmissivity, the second resolution and the second field of view.

A diffractive imaging device consistent with certain embodiments has an opaque planar sheet with a plurality of pinholes defining a photon sieve in the sheet. The photon sieve has at least first and second sectors with the first sector exhibiting a first focal length, a first field of view, a first transmissivity, a first resolution and a first wavelength; and with the second sector exhibiting a second focal length, a second field of view, a second transmissivity, a second resolution and a second wavelength. At least one of the first focal length, the first wavelength, the first transmissivity, the first resolution and the first field of view is different from the second focal length, the second wavelength, the second transmissivity, the second resolution and the second field of view.

The pinholes used in the examples of FIGS. 6 and 7 are approximately circular, but this should not be considered limiting. For example, in other embodiments, it may be desirable to use pinholes, as described above, which are elliptical, oval or shaped to conform to the shape of the region bounded by the pie shaped sector's intersection with the Fresnel zone as will be discussed in greater detail in connection with FIG. 8

Figure 7A:
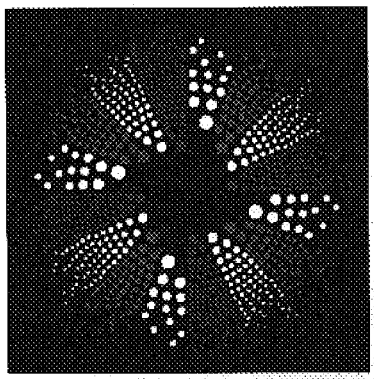
FIG. 7A illustrates a photon sieve design in which pinholes are omitted when they will not fit within the boundaries of a Fresnel zone and a multi-chromatic sector.
Figure 7B:
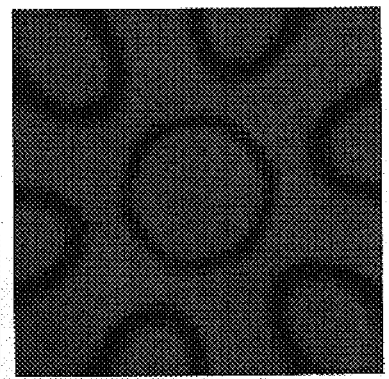
FIG. 7B illustrates the blue light point spread function resulting from the photon sieve of FIG. 7A.

FIG. 7A depicts a PS 250 which has been divided into sixteen separate sectors designed to pass four separate wavelengths of light radiation, red, blue, green and near infrared (NIR, represented by the white pinholes), thus producing a poly-chromatic or multi-chromatic PS. By strict adherence to design of the PS to optimize passage of radiation at each wavelength, the innermost Fresnel zones cannot in all cases accommodate pinholes of "standard" or "optimal" size. This occurs since the available area within each pie-slice shaped sector decreases in size as the center of the PS is approached, and the pinholes adjacent the center are largest in a conventional PS design. When the pinholes are omitted due to the inability to fit them into the appropriate sector, the point spread function (PSF) (a measure of the sharpness of the image produced by the lens that uses a point source of radiation passed through the lens) of the lens deteriorates. This is depicted by the image of FIG. 7B for the blue wavelength. The PSF is ideally a single spot in the center of FIG. 7B without the surrounding spots that represent undesirable side lobes that contribute to a blurred image.

Figure 7C:
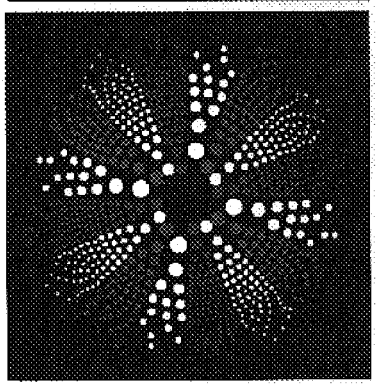
FIG. 7C illustrates a photon sieve with sub-optimal size pinholes and FIG. 7D shows the resulting blue light point spread function resulting therefrom.
Figure 7D:
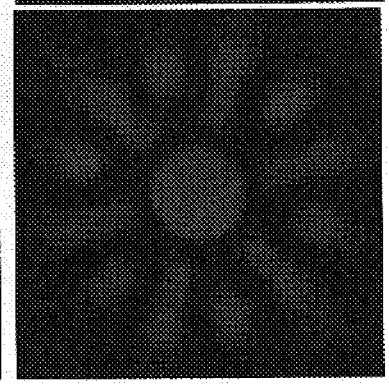

If pinholes are added in the inner Fresnel zones as depicted in PS 260 of FIG. 7C, which are "suboptimal" for the wavelength design, the PSF is dramatically improved as depicted in FIG. 7D, rendering an image that approaches the sharpness of a monochromatic PS that do not impose the geometric constraints of the sectors. In this case, the side lobes are dramatically reduced in intensity and the center image is more sharply defined representing a better PSF.

The principle just described is further illustrated in FIG. 8. In this figure, assume that lines 264 and 266 define the boundaries of a region of a poly-chromatic or multi-chromatic PS consistent with certain embodiments of the present invention (e.g., the pie shaped sectors of FIGS. 6-7). If the dashed circle 270 represents the size of a pinhole that is called for in order to optimize passage of radiation in the innermost Fresnel zone (100% or the Fresnel zone width), defined by boundaries 268 and 269, the pinhole will impinge upon the adjacent sector. By use of a suboptimal size pinhole 272 that fits within the intersection of the sector boundaries and the Fresnel zone boundaries, an improved PSF can be achieved. In this case, the pinhole 272 is circular, but the pinhole could also be elliptical, or could roughly or exactly conform to the shape of the boundaries of the union of the pie-slice shaped sector and the Fresnel rings.

Moreover, the pinhole may not need to be coaxial with the optimal circular pinhole as shown. In this case, the pinhole is circular and occupies the largest circular region bounded by the Fresnel zone and the sector boundaries. It has been shown (see "Sharper Images by Focusing Soft X-Rays with Photon Sieves", Kipp et al., Nature, vol. 414, Nov. 8, 2001, which is hereby incorporated by reference) that good performance can be achieved when the pinhole is even larger than the width of the Fresnel zone, and little degradation in image is seen at near infra-red for pinholes that are approximately 1.2 times D (where D is a width of Fresnel zone) as shown in the FIG. 8. Reasonable performance in some applications may even be achieved for pinhole diameters up to about 1.53 times D. Thus, the term "suboptimal" as used herein should be taken in the context of design constraints. That is, for a photon sieve designed to use circular pinholes of 1.2 times the width of the Fresnel zone, a pinhole of 1.0 times the width of the Fesnel zone may be considered "suboptimal" within the context of the present teaching (even though it would be conventionally considered optimal, and in fact is for a given photon sieve parameter). Image sharpness decreases with increased pinhole size, but radiation transmission increases, so these factors can be traded off.

As shown in FIG. 9A, a region having approximately the shape of the region bounded by the Fresnel zone and the sector boundaries, as shown by the shaded region 274 may be used as a pinhole advantageous in some embodiments. The wedge shaped pinhole 274 may also extend beyond the bounds of the Fresnel Zones or sector boundaries. FIG. 9B illustrates an exemplary polygon (pentagon, in this example) shaped pinhole 275 that may be used in certain embodiments. FIG. 9C illustrates an oval shaped pinhole 279 and a rectangular shaped pinhole 281 that may be used in certain embodiments consistent with the present invention. The effects of various combinations of pinhole shapes can be determined experimentally, by mathematical analysis or by simulation. As mentioned above, good results can be achieved with pinholes exceeding the optimum pinhole size for circular pinholes, and it is anticipated that the same is true for pinholes that are not circular in shape. Thus, "optimum" depends on the end result desired, however, as described above, adding a "sub-optimum" pinhole (i.e., using a pinhole of a size that will fit, even if theoretically not optimally sized or centered) in a segmented photon sieve such as a multi-chromatic lens can contribute substantially to improvement in both radiation transmission and to the point spread function (compared with omission of pinholes altogether if they do not fit). Additionally, non-circular pinholes can be used to better conform to the available boundaries of the Fresnel zones and/or sector boundaries, and may be more easily generated by computer as segments of lines (e.g. 275). Thus the sizes and location of the pinholes in at least one of the sectors can be adjusted in any number of ways to facilitate transmissivity and PSF while adjacent pinholes are kept separated.

In accordance with certain embodiments consistent with the present invention, a segmented photon sieve such as a poly-chromatic PS can be designed to have the multiple wavelengths focus at differing or the same focal point or focal plane. This is depicted in FIGS. 10-11. In FIG. 10 radiation having two different wavelengths indicated by $\lambda 1$ and $\lambda 2$ are passed through a photon sieve 276 with the pinholes designed for a focal length that corresponds to a distance to a first detector 278 for $\lambda 1$ and to a second detector 280 for $\lambda 2$. Alternatively, as depicted in FIG. 11, radiation having two different wavelengths indicated by $\lambda 1$ and $\lambda 2$ are passed through a photon sieve 276 with the pinholes designed for a focal length that corresponds to a distance to a single detector 286.

In another embodiment consistent with the present invention, the pinholes are located not only on even (or only odd) Fresnel zones, but on both. In this embodiment, a patterned half-wave phase-shifter overlays every other Fresnel zone (full ring for monochrome and within appropriate sectors for multi-wavelength), so that diffracted radiation from both even and odd zones arrives at focus in phase. This is accomplished in a manner analogous to phase-shift Fresnel zone plates. Using this technique, one can increase radiation intensity in focus by a factor up to 4. In practicing this embodiment, areas of the photon sieve that are normally opaque are fabricated with pinholes and a phase shift medium that produces a phase shift of approximately $\lambda/2$ at the wavelength of interest. This permits the surface area that is normally opaque to prevent destructive interference to be used to contribute positively to the radiation intensity passed by the lens.

In another embodiment consistent with the present invention, suitable for multi-wavelength photon sieves, opaque zones of one wavelength (and/or other characteristic such as focal length) can be used to carry pinholes for another wavelength. This is accomplished by use of a suitable filter (e.g., an optical filter) that permits the opaque zones as defined for a first wavelength to continue to appear opaque at that first wavelength. Pinholes in the opaque zones at the first wavelength can then pass radiation at other wavelengths to permit operation as a multi-chromatic lens.

Figure 12:
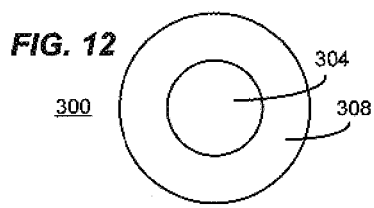
FIG. 12 illustrates an alternative layout for regions of a photon sieve consistent with certain embodiments of the present invention.

Another arrangement for providing a multi-chromatic or poly-chromatic (used synonymously herein) segmented photon sieve lens is depicted in FIG. 12. In this arrangement, a multi-chromatic lens is divided circumferentially rather than radially as in prior embodiments, so that the multiple regions are concentric. In this embodiment a lens 300 can be provided so that pinholes placed in the inner area 304 are designed for a first wavelength, while pinholes placed in the outer area 308 are designed for a second wavelength. Thus, a single PS can be fabricated to produce a multi-chromatic lens structure. It is noted that resolution provided by the inner region 304 is better than that provided by the outer region 308. This can be capitalized upon to produce a lens well suited for foviated vision (higher resolution in the center of a target field of view, and reduced resolution off center). This can be done by focusing the image from 304 on a first detector and the image from 308 on a second detector. The second detector can be used for wide field of view (FOV) vision, while the first detector is used for narrower, but more precise images. Additional examples that are useful for foviated vision will be presented later.

Figure 13A:
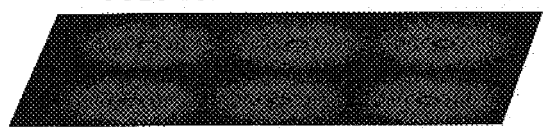
FIG. 13, which is made up of FIG. 13A, FIG. 13B
FIG. 13C illustrates three exemplary photon sieve arrays consistent with certain embodiments of the present invention.
Figure 13B:
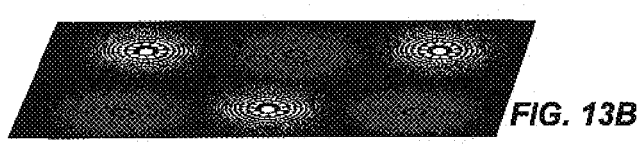
Figure 13C:

With reference to FIG. 13, it is noted that multiple arrangements of PS lenses can be advantageously fabricated on a single substrate. FIG. 13A depicts an array of six such PS monochromatic lenses on a single substrate. FIG. 13B depicts an array of PS lenses that produce an effective multi-chromatic segmented photon sieve lens system by use of three PS devices that pass radiation of a first wavelength and three PS devices that pass radiation of a second wavelength. FIG. 13C depicts an array of four multi-chromatic PS lenses that are useful for radiation at four different wavelengths. Other variations will occur to those skilled in the art upon consideration of the present teaching.

Thus, an imaging device consistent with certain embodiments has an opaque planar sheet and a plurality of pinholes defining a first photon sieve in the sheet. A plurality of pinholes also define a second photon sieve in the sheet. The first photon sieve exhibits a first focal length, a first field of view, a first transmissivity, a first resolution and a first wavelength. The second photon sieve exhibits a second focal length, a second field of view, a second transmissivity, a second resolution and a second wavelength. At least one of the first focal length, the first wavelength, the first transmissivity, the first resolution and the first field of view is different from the second focal length, the second wavelength, the second transmissivity, the second resolution and the second field of view.

Figure 14:
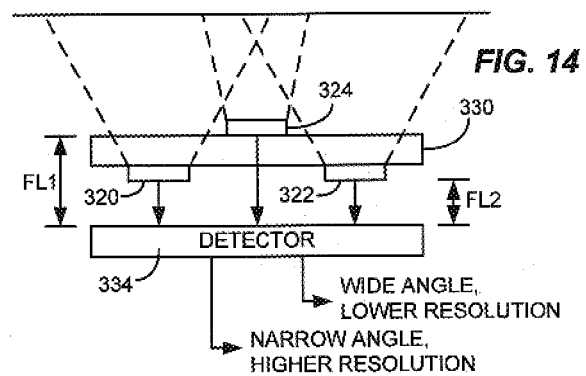
FIG. 14 illustrates an embodiment using photon sieves disposed on both top and bottom surfaces of a substrate consistent with certain embodiments of the present invention.

PS lenses can be designed to have variations in resolution, radiation transmissivity, focal length, design wavelength and field of view. Additionally, the preceding discussion makes it clear that the design wavelength can be multiple wavelengths in a single PS. Thus, although the above examples have dealt primarily with using the multiple regions of a segmented photon sieve to process radiation at multiple wavelengths, this should not be considered limiting. Each region could be designed to produce variations in any one or more of the device's parameters such as, but not limited to resolution, radiation transmissivity, focal length, design wavelength and field of view, FIG. 14 depicts another arrangement suitable for a foviated vision system in which lenses 320, 322 and 324 are disposed on both surfaces of a substrate 330, by deposition of opaque and transparent areas on each side of the substrate. In this example, a detector or detector array 334 is spaced apart at a consistent distance from the substrate 330 resulting in lens 324 having a focal length of FL1 and lenses 320 and 322 having a focal length of FL2. If lens 324 is designed to have a narrow field of view with high resolution, and lenses 320 and 322 have a relatively wider angle field of view (possibly overlapping) and a lower resolution, the detector can be used to produce foviated vision by use of lens 324 for a sharper central image and lenses 320 and 322 for lower resolution images with a wider FOV. The images from 320 and 322 can be combined in a programmed processor. The image from 324 can be combined with the other images or made available for separate viewing. By using both sides of the substrate along with the other degrees of freedom afforded by the segmented photon sieve technology described above, many variables are under the control of the designer.

Figure 15:
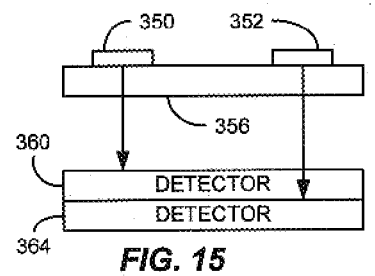
FIG. 15 illustrates an embodiment using multiple photon sieves with different focal lengths using multiple stacked detector devices consistent with certain embodiments of the present invention.

Another example lens and detector arrangement is depicted in FIG. 15, which illustrates that two lenses 350 and 352 disposed on substrate 356 can be designed to have two different focal lengths to focus on two different detector devices 360 and 364 in a stacked arrangement. Schematically, this can represent either two separate lenses 350 and 352 or a single multi-chromatic lens having multiple focal lengths, or a single multiple focal length mono-chromatic lens. In this arrangement, detector 360 should be transparent or at least not totally opaque to the output of lens 352 to permit radiation to pass from lens 352 through detector 360 to detector 364. In other arrangements, a stair-stepped approach can be used rather than transparency. The lenses 350 and 352 can be fabricated on or applied to the surface of the substrate 356, or can be fabricated as pinholes through substrate 356 if the substrate is made opaque at wavelengths of interest.

In another embodiment consistent with the present invention as depicted in FIG. 16, an array of photon sieves can be used for imaging the same scene. In this example, consider the array made up of three PS devices 402, 404 and 406 imaging a common target. The photon sieves in the array may be identical, for example for monochromatic imaging, or different, such as optimized for different wavelengths or focal lengths (and fields of view). For purposes of this example, assume that the three PS devices 402, 404 and 406 are identical. These lenses focus on three detectors (e.g., CMOS radiation detectors such as charge coupled device (CCD) detectors, array photodiodes, CMOS array photo-detectors, photo-resistors, bolometers, visible light detectors, X-ray detectors, infra-red detectors, near infra-red detectors, terahertz frequency detectors, microwave detectors, ultraviolet detectors, or any other detector compatible with detecting the radiation at the wavelength for which the photon sieve is designed to focus), or equivalently three regions of a single detector. The three detectors 410, 412 and 414 each produce an output with a signal-to-noise ratio (SNR) that should be identical. These three outputs can be combined in a processor 418, such as a programmed general purpose computer running a computer program, to produce an output having a combined signal that has an improved signal to noise ratio SNRC. In this example, the improvement in signal to noise ratio is by a factor of $\sqrt{3}$.

To generalize, if N identical lenses in the array produce N images, then by electronically averaging (or adding) these images, one obtains a resultant image with signal-to-noise ratio improved by a factor of $\sqrt{N}$. This is equivalent to increased radiation transmission over that of system having a single diffractive element. Because photon sieves are extremely compact, an array of many PS lenses are likely to be smaller and lighter than refractive optics with the same radiation transmission (or the same resultant signal-to-noise ratio). Such an averaging or adding process can be carried out in processor 418 under computer program control.

Thus, an imaging device consistent with certain embodiments has a plurality of N detectors with a corresponding plurality of N diffractive lenses imaging a single target, with each of the N lenses focused on one of the N detectors. A processor combines the images captured by each of the N detectors to produce a single image.

To extend this concept, a plurality of images can also be combined into a single composite image (e.g., a panoramic or other wider angle field of view) by use of multiple detectors, multiple lenses and a processor. In this embodiment three lenses are again used by way of example. As depicted in FIG. 17, the multiple lenses 422, 424 and 426 can be fabricated on a single planar substrate 430 as shown. The image to the central lens is shown (in this example) to be obtained by focusing it directly on the target image so that light rays 432 pass directly to the lens 424. The images received by lenses 322 and 326 receive radiation reflected by mirrors 334 and 336 respectively. The images produced from light rays 440 and 442 are reflected from target areas adjacent to the target area imaged by lens 424. These three images are received at three regions of a detector 444 (which is entirely equivalent to three individual detector devices and is considered synonymous herein). Therefore, the images from these three lenses can be combined at processor 450 to produce a composite (in this example case, a panoramic view) from the three individual images. It is noted that conventional mirrors can be used to reflect visible light and other radiation that can be reflected by conventional mirrors. Equivalently, other reflective surfaces can serve as mirrors so long as the reflective surface reflects radiation at the wavelength of interest that is to be focused by the photon sieves. Accordingly, the term "mirror" as used herein is intended to mean any device that reflects radiation at the frequency of interest and is not to be considered limited to conventional optical wavelength glass mirrors and the like.

Thus, an imaging system consistent with certain embodiments has a plurality of N detectors and a plurality of N photon sieves, each photon sieve having a field of view. Each of the N photon sieves directs an image from its field of view on one of the N detectors. A processor combines the images captured by each of the N photon sieves and N detectors to produce a single image.

Another imaging device consistent with certain embodiments has a planar array of photon sieve lenses and an array of mirrors with one lens associated with each mirror. Each mirror reflects radiation to its associated lens from a specific angle to provide a reflected field of view that is not centered on an axis perpendicular to the planar array to be captured by the lens.

Another imaging device consistent with certain embodiments has a planar substrate. A first photon sieve lens is situated on the planar substrate. A second photon sieve lens is situated on the planar substrate. A mirror is associated with the second photon sieve lens, and the mirror reflects radiation to the second photon sieve lens from an angle that permits a field of view that is not centered on an axis perpendicular to the planar array to be captured by the lens.

Figure 18:
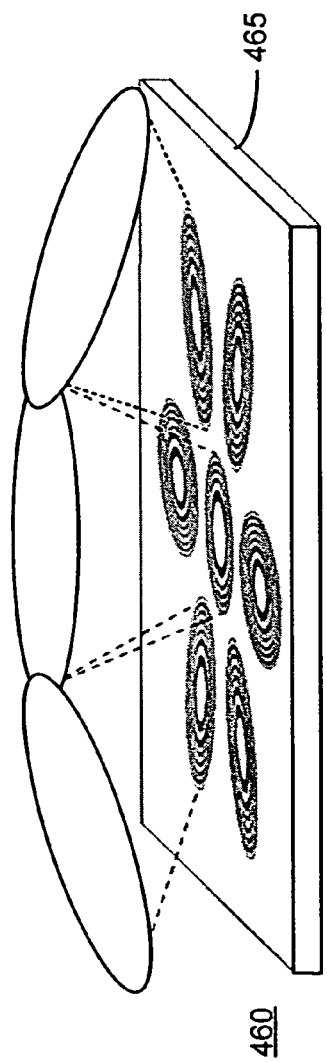
FIG. 18 illustrates an array of photon sieves designed for wide field of view consistent with certain embodiments of the present invention.

As described earlier, photon sieves can also be designed in an elliptical geometry rather than circular. That is, in an elliptical photon sieve, the pinholes are arranged approximately at Fresnel zones defined by approximately concentric ellipses. An array 460 of such PS lenses as depicted in FIG. 18 can be used to produce a wider field of view than that normally available for circular PS lenses. In this example, array 460 is made up of a substrate 465 carrying seven elliptical lenses that are designed to collectively capture a relatively wide FOV, with overlapping field of view so that the images can be electronically stitched together to produce a continuous image with a wide FOV. This device has the advantage of producing a wide FOV with a lens that can be very small, substantially planar and light weight.

Thus, an imaging device consistent with certain embodiments has a planar substrate with a plurality of pinholes forming a photon sieve disposed on the substrate. The pinholes are arranged in elliptical Fresnel zones to produce a photon sieve having a field of view that is centered off axis from an axis that is perpendicular to the planar substrate.

An imaging device consistent with certain embodiments has a planar substrate and a first photon sieve lens situated on the planar substrate. A second photon sieve lens is also situated on the planar substrate. At least one of the first and second photon sieves comprises an elliptical photon sieve.

An imaging device consistent with certain embodiments has a planar substrate and an array of photon sieve lenses situated on the planar substrate. The array of photon sieves comprises a plurality of elliptical photon sieves having overlapping fields of view to create a wider field of view than a single photon sieve.

Figure 20:
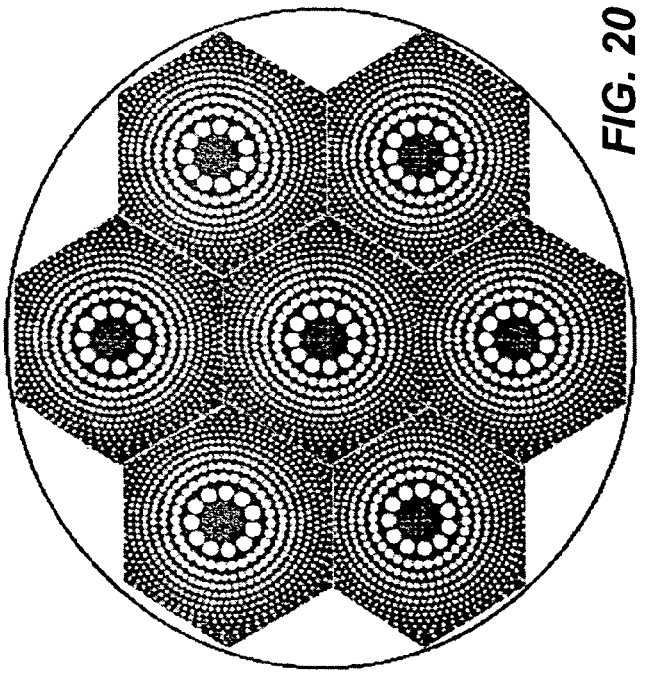
FIG. 20 illustrates another technique for packing multiple photon sieves onto a single substrate consistent with certain embodiments of the present invention.
Figure 19:
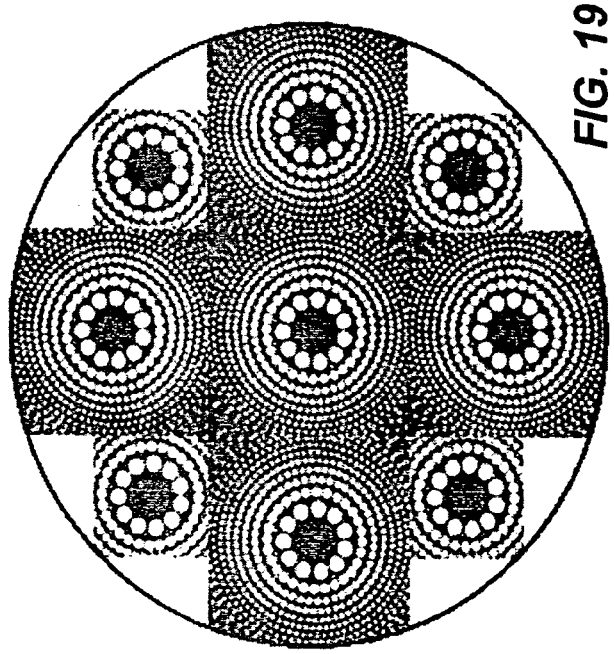
FIG. 19 illustrates one technique for packing multiple photon sieves onto a single substrate consistent with certain embodiments of the present invention.

In some circumstances, it may be desirable to pack a substantial number of PS lenses into a relatively small area. In such cases, any number of packing strategies may be imposed upon a planar array of PS lenses. FIG. 19 depicts one strategy wherein PS lenses are defined in square or rectangular boundaries and truncated where necessary to fit within the available surface area of the substrate (shown as circular in this example). In another embodiment, depicted in FIG. 20, the PS lenses are truncated in a hexagonal shape to permit hexagonal close packing. Other arrangements are also possible for either mono-chromatic or multi-chromatic lens arrangements.

In many surveillance applications, portability and weight of a remote imaging device are significant factors that render refractive optical systems cumbersome to use. While wide-angle images can indeed be obtained using multi-component refractive optics, these lenses tend to be bulky and heavy. Additionally, refractive imaging lenses with field of view (FOV) between 90° and 130° have extremely uneven illumination across the field and distortions sometimes exceeding 40%, requiring extensive image processing for scene restoration. Furthermore, obtaining a full 180° FOV can involve combining images from several individual imaging systems, each with its own optics and detector. Such an arrangement further reduces opportunities for portability and weight reduction.

In accordance with certain embodiments consistent with the present invention, an imaging device uses multiple photon sieve lenses, with their respective partial images of the target scene reflected by mirrors onto a single common plane. Single or multiple image sensors are arranged in that plane, so that all partial images, when combined, have a composite FOV covering a wide angle. In certain embodiments, the coverage can be made free of blind spots. In this embodiment, a single detector or multiple detectors are arranged in a single plane, eliminating the need for bulky and heavy mounting part(s) as well as the need for wiring multiple distinct detectors in confined space. Such an arrangement may also improve the system's reliability, since its lightweight parts are less likely to come out of alignment and/or electrical contact due to high-G maneuvers of a carrier vehicle, vibration and other mechanical loads. Additionally, the assembly and alignment is much easier than for a system with multiple optical axes and individual detectors for each of these. Finally, incorporating additional layers, such as antireflective coatings, weather-resistant and anti-abrasive coatings etc., is much easier if optical elements to be coated are arranged on a single plane, especially if the optical elements themselves are planar (such as Fresnel zone plates or photon sieves).

Figure 21:
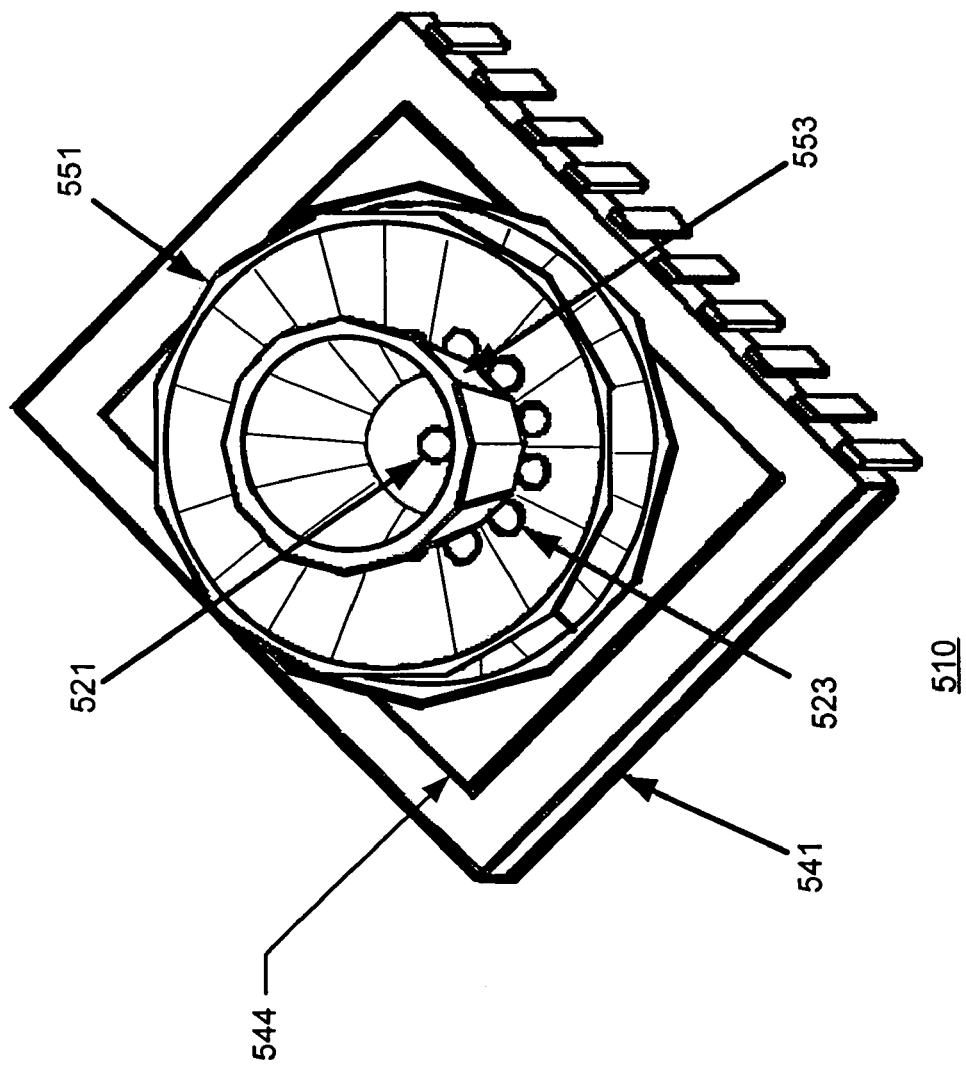
FIG. 21 illustrates a 180 degree field of view imaging system consistent with certain embodiments of the present invention.

One exemplary embodiment of a detector system consistent with the present invention is shown in FIG. 21. The imaging subsystems 523 and 521 are made up of PS lenses or lens arrays that project onto the sensing surface of a detector chip 541. Lens subsystem 521 looks straight up. All other lens subsystems 523 have their fields of view modified by reflections from mirrors 553. A mirror 553 can have a single lens subsystem 523 associated with it, or for certain applications it can have more than one such subsystem. If multiple lens subsystems 523 are used with some or all of the mirrors 553, each group of lens subsystems 523 associated with a certain mirror 553 comprises subsystems with different focal lengths (i.e. magnifications) or/and different design wavelengths. Similarly, there may be a single lens subsystem 521 or plurality of them. In embodiments whereby multiple lens subsystems 521 and/or multiple lens subsystems 523 associated with each or some of the mirrors 553 are provided include multi-wavelength (color) imaging applications, as well as applications where multiple selectable resolutions and/or magnifications are desirable.

Mirrors 553 form the facets of mirror assemblies 551, and they may be either an integral part of the assemblies, coatings on the surfaces of the assemblies, or separate parts attached to the assemblies. Each facet 553, in the present embodiment reflects a target image to a PS lens or PS lens array. Assemblies 551 can be attached directly to or form a part of the window 544 covering a semiconductor chip 541 that incorporates one or more detector devices, with or without an optional spacer. The spacer can also carry the lens subsystems 521 and/or 523. In certain embodiments, the lens subsystems 521 and 523 are represented by photon sieves fabricated as part of the window 544 sealing the chip package.

Also in certain embodiments, mirror assemblies are represented by lightweight composite parts with polished facets, with reflective coating deposited on the facets. The mirror assemblies in the preferred embodiment are attached to the window sealing the chip package by a known method, such as gluing or ultrasonic welding. For added rigidity, reinforcing ribs may be provided, some ribs reinforcing individual mirror assemblies, and/or some ribs connecting several mirror assemblies together. The rib positions and dimensions are chosen so as to avoid obscuring the FOVs of any of lens subsystems 521 and/or 523. Additional ribs may extend to the surface of the window 544, adding rigidity to the assembly (especially for applications where the system is likely to experience high-G maneuvers and/or vibration).

Figure 23:
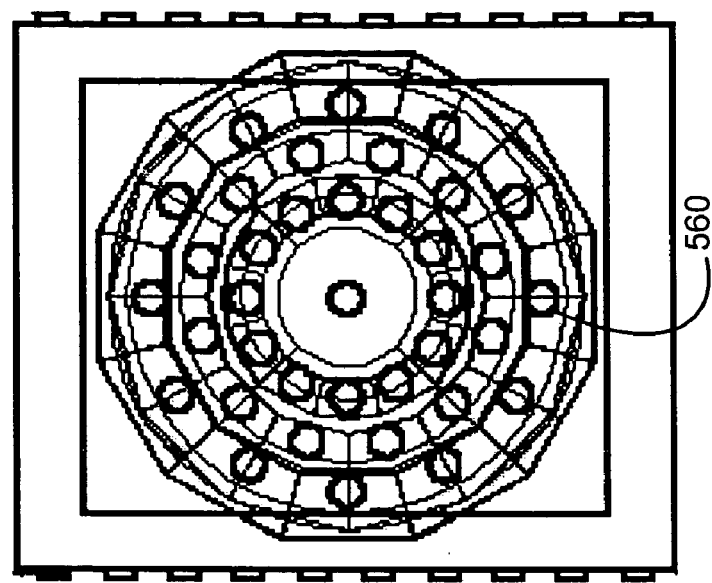
FIG. 23 illustrates a top view in wire frame of the 180 degree field of view imaging system consistent with certain embodiments of the present invention.
Figure 22:
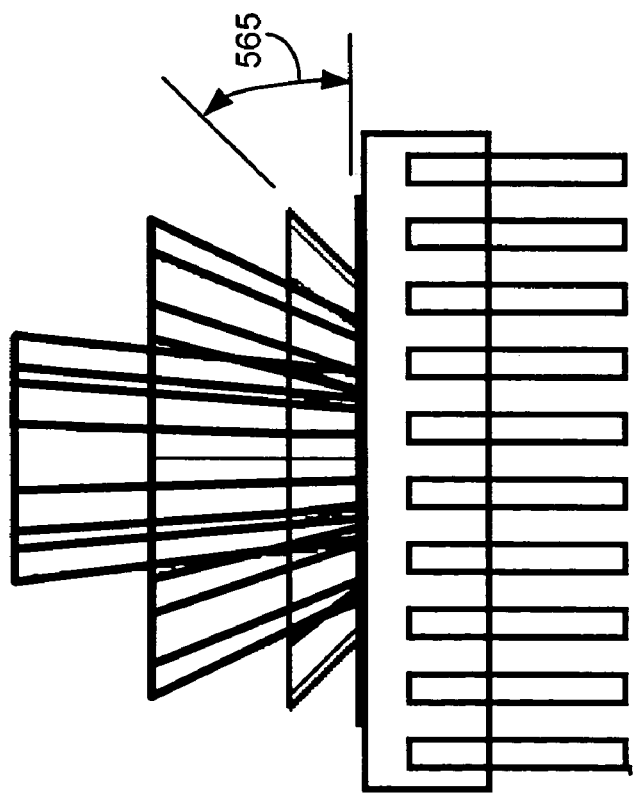
FIG. 22 is a side view of the 180 degree field of view imaging system consistent with certain embodiments of the present invention.

The apparatus of FIG. 21 is further illustrated in FIGS. 22-23 in which FIG. 22 is a side view with the mirror assembly shown in wire frame, and FIG. 23 shows a top down view of the detector system with the mirror assemblies again shown in wire frame. The mirror assemblies are made up of three (in this example embodiment) approximately conic sections with mirror facets that direct radiation from a specific range of angles to each lens subsystem such as 560. The angle of the mirror (e.g., angle 565 for the lowermost conic section) and number of mirrors are determined by the FOV of each lens subsystem. In this embodiment, in order to provide a full 180 degree FOV, enough mirrors and lens subsystems are provided to assure overlapping FOV of each lens in progressively smaller cones of imaging for 100 percent coverage. Thus, the number of lens subassemblies, number of mirrors and angular placement of the mirrors are interrelated and will vary depending upon factors such as desired FOV, resolution, transmissivity, wavelength, etc. This is provided in a very small package that can sit atop an integrated circuit package for certain embodiments.

Thus, a wide angle imaging device consistent with certain embodiments has a planar array of photon sieve lenses and an array of mirrors with one lens associated with each mirror. The mirrors are arranged to form faceted concentric conic sections, wherein each mirror reflects radiation to its associated lens from a specific angle to permit a field of view that is not centered on an axis perpendicular to the planar array to be captured by the lens. A detector is situated at a focal plane of the array of lenses to detect images from the array of diffractive lenses.

The imaging system according to certain embodiments consistent with the present invention produces an image of the scene by combining multiple partial images from several areas of the sensor or sensors in much the same manner as that used in the much simpler example embodiment described in connection with FIG. 17. This is accomplished by using a programmed processor such as a computer or microprocessor running a computer program. The processor may optionally be a part of the imaging device, or located adjacent or nearby and either directly connected to the imaging device or otherwise operatively coupled thereto.

In certain embodiments, the raw data from the imaging device is transmitted to a remote location by known means, such as radio, microwave or optical communication. The transmission may optionally be in real time, and may be uncompressed or compressed. One exemplary method of compression is pre-selection of the areas of the sensor representing the partial images, and transmitting data only from these areas.

Another exemplary method of compression is pixel binning, whereby signal from several adjacent pixels in the sensor array is averaged and transmitted as a single pixel. Pixel binning can not only reduce the bit rate (at the expense of resolution), it can also increase the sensitivity of the imaging system. The binning algorithm is preferably flexible, so that part of an image selected for detailed viewing can be transmitted at a higher resolution if desired. In surveillance applications, a remote operator or computer may identify a region of interest (ROI) to be imaged at a higher resolution, up to the maximum resolution (without binning).

Figure 24:
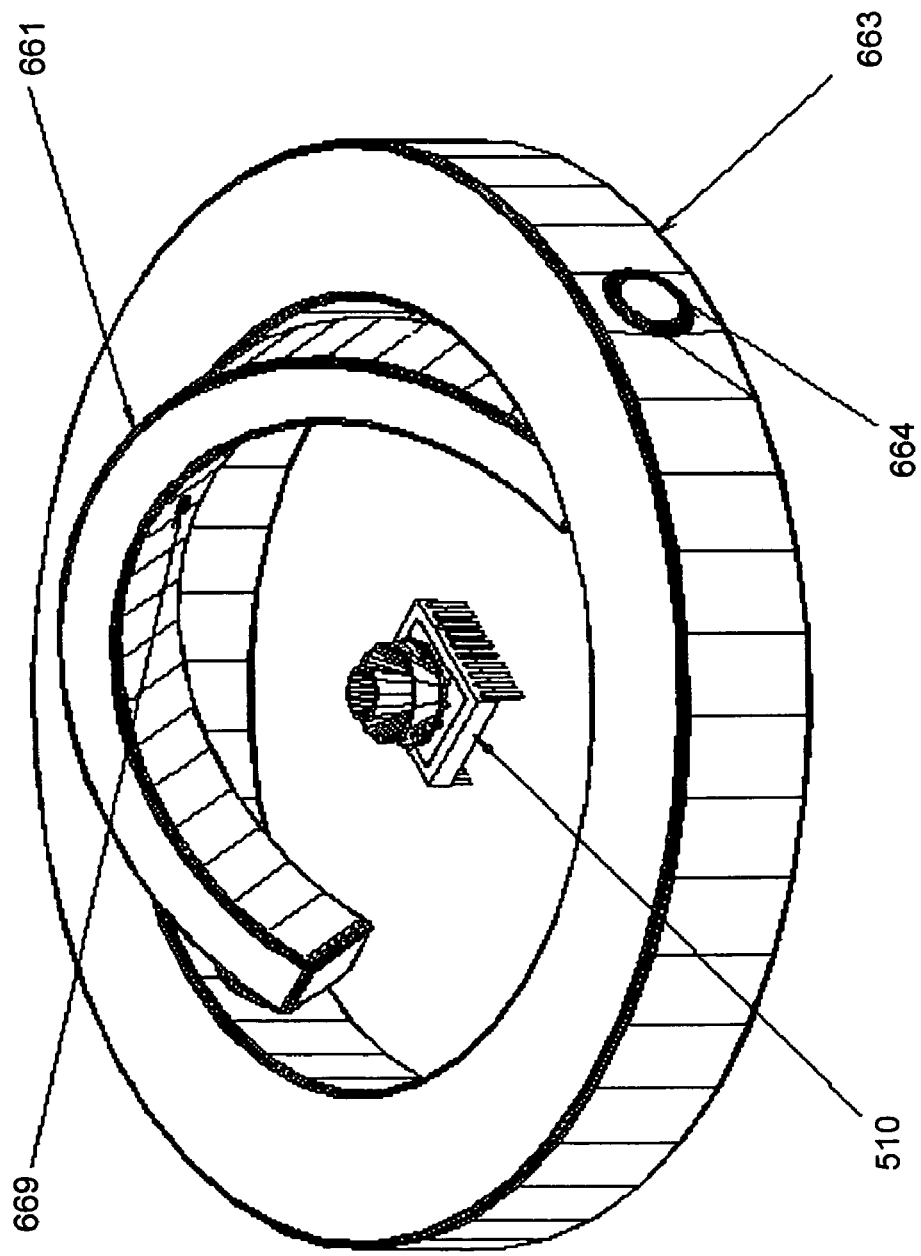
FIG. 24 illustrates a calibration system for the 180 degree field of view imaging system consistent with certain embodiments of the present invention.

The recovery of the image of the scene from the partial images can be done by mapping pixels onto spatial coordinates. In certain embodiments, the imaging system is pre-calibrated by placing it in the center of rotation of a two-axis precision motion device such as the one depicted in FIG. 24. Azimuth motion 663 carries axis 664 of rotation for the elevation motion 661. The latter carries a calibration radiation source 669. At any position (azimuth and elevation) of the source, it is imaged by one or more pixels of the sensor 510. The relation between Cartesian coordinates of these pixel(s) and the coordinates of the source forms a map, which is saved in memory associated with the imaging device and is later used to reconstruct the composite image from partial images.

In accordance with certain embodiments consistent with the present invention, the precision of the mapping is increased by the following procedure. After an initial positioning of the calibration radiation source 669, a group of illuminated pixels is selected and a feedback system turned on, whereby the position of the source 669 is adjusted so as to maximize the illumination of the most brightly illuminated pixel in the group. The final azimuth and elevation after the adjustment procedure are the map coordinates for that pixel.

The same setup can also be used to calibrate the sensitivity across the sensor surface of sensor 510 so as to compensate for illumination non-uniformity of the lens subsystems 521 and 523 and associated detectors. An intensity correction factor can be entered into memory for each pixel, preferably simultaneously with mapping the polar coordinates for that particular pixel as described above. This factor can be read from the pixel of the composite image when the source 669 of standard intensity is imaged with the maximum intensity in that pixel. The correction factors are used in image recovery algorithm by dividing readings for each pixel by this pixel's correction factor.

If a group of lens subsystems 521 or 523 is used, comprising subsystems with different focal lengths or/and design wavelengths, the same calibration procedure can be used to map each of the subsystems (with appropriate wavelength(s) of the calibration radiation source.

Those skilled in the art will recognize, upon consideration of the above teachings, that certain of the above exemplary embodiments are based upon use of a programmed processor such as processors 418 or 450. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices should be considered equivalents.

Software and/or firmware embodiments may be implemented using a programmed processor executing programming instructions that in certain instances are broadly described above that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. An imaging device, comprising:
an opaque planar sheet;
a first arrangement of pinholes in the sheet the pinholes lying approximately along first arcs of concentric Fresnel zones rings;
the position of the first arcs being determined by Fresnel diffraction to focus a first wavelength, with a first transmissivity and a first resolution, at a first focal length over a first field of view; and
a second arrangement of pinholes in the sheet, the pinholes lying approximately along second arcs of concentric Fresnel zone concentric rings;
the position of the second arcs being determined by Fresnel diffraction to focus a second wavelength, with a second transmissivity and a second resolution, at a second focal length over a second field of view; and
wherein at least one of the first focal length, the first wavelength, the first transmissivity, the first resolution and the first field of view is different from the second focal length, the second wavelength, the second transmissivity, the second resolution and the second field of view.

2. The device according to claim 1, further comprising a first filter that passes the first wavelength filtering the first arrangement of pinholes and a second filter that passes the second wavelength filtering the second arrangement of pinholes.

3. The device according to claim 1, further comprising:
a first detector that detects the first wavelength receiving a signal passed at the first wavelength; and
a second detector that detects the second wavelength receiving a signal passed at the second wavelength.

4. The device according to claim 3, wherein the first and second detectors comprise two regions of a single detector device.

5. The device according to claim 3, wherein the first and second detectors comprise detectors that respond to a type of radiation passed by the first and second arrangements, respectively.

6. The device according to claim 1, wherein at least one of pinholes is non-circular.

7. The device according to claim 1, wherein at least one of the pinholes is suboptimal in size.

8. The device according to claim 1, wherein the Fresnel zone rings comprise one of ellipses or circles.

9. The device according to claim 1, wherein sizes of the pinholes in at least one of the arrangements of pinholes are selected so that adjacent pinholes are separated.

10. The device according to claim 1, wherein the angular dimensions of the arcs and linear dimensions of the pinholes are selected to determine the transmission of each of the first and second wavelengths.

11. The device according to claim 1, further comprising a phase shifter shifting the phase of radiation entering certain of the pinholes.

12. An imaging device, comprising:
an opaque planar sheet;
a plurality of pinholes defining a photon sieve in the sheet;
wherein, the photon sieve comprises at least first and second regions;
the first region exhibiting a first focal length, a first field of view, a first transmissivity, a first resolution and a first wavelength;
the second region exhibiting a second focal length, a second field of view, a second transmissivity, a second resolution and a second wavelength; and
wherein at least one of the first focal length, the first wavelength, the first transmissivity, the first resolution and the first field of view is different from the second focal length, the second wavelength, the second transmissivity, the second resolution and the second field of view.

13. The device according to claim 12, further comprising a first filter that passes the first wavelength and filtering the first region, and a second filter that passes the second wavelength and filtering the second region.

14. The device according to claim 12, wherein the first and second regions comprise pie-slice shaped regions.

15. The device according to claim 12, further comprising:
a first detector that detects the first wavelength, receiving a signal passed by the first photon sieve; and
a second detector that detects the second wavelength, receiving a signal passed by the second photon sieve.

16. The device according to claim 15, wherein the first and second detectors comprise detectors that respond to radiation passed by the first and second sectors respectively.

17. The device according to claim 15, wherein the first and second detectors comprise two regions of a single detector device.

18. The device according to claim 15, wherein the first and second detectors comprise a single detector that is responsive to signals at both the first and second wavelength.

19. The device according to claim 15, wherein the first detector is situated at a first focal length and wherein the second detector is situated at a second focal length.

20. The device according to claim 12, wherein at least one of pinholes is non-circular.

21. The device according to claim 12, wherein at least one of the pinholes is suboptimal in size.

22. The device according to claim 12, wherein the pinholes are disposed approximately at Fresnel zone rings, and wherein the Eresnel zone rings comprise one of ellipses or circles.

23. The device according to claim 12, wherein the first and second regions are concentric in geometry so that the second region surrounds at least a portion of the first region.

24. The device according to claim 12, wherein the first region exhibits narrower field of view and higher resolution compared to the second region, and wherein the second region exhibits wider field of view and lower resolution compared to the first region.

25. The device according to claim 12, wherein the dimensions of the regions and dimensions of the pinholes are selected to determine the transmission each of the first and second wavelengths.

26. The device according to claim 12, further comprising a phase shifter shifting the phase of the radiation entering certain of the pinholes.

27. An imaging system, comprising:
a plurality of N detectors where N is an integer greater than 1;
a plurality of N photon sieves, each photon sieve having a field of view; each of the N photon sieves directing an image from its field of view on one of the N detectors; and
a processor that combines the images captured by each of the N photon sieves and N detectors to produce a single image.

28. The imaging system according to claim 27, wherein at least one of the plurality of N photon sieves comprise a segmented photon sieve.

29. The imaging system according to claim 27, wherein the plurality of N detectors comprises detectors that respond to radiation passed by the plurality of N photon sieves.

30. The imaging system according to claim 27, wherein the plurality of N detectors comprise a single detector device with multiple regions.

31. The imaging system according to claim 27, wherein at least one of the N detectors is situated at a first focal length and at least another of the N detectors is situated at a second focal length.

32. The imaging system according to claim 27, wherein at least one of the photon sieves contains a pinhole that is non-circular.

33. The imaging system according to claim 27, wherein at least one of the photon sieves contains a pinhole that is suboptimal in size.

34. The imaging system according to claim 27, wherein one of the photon sieves exhibits narrower field of view and higher resolution compared to another of the photon sieves.

35. The imaging system according to claim 27, wherein certain of the plurality of photon sieves are disposed on a first side of a substrate and certain others of the plurality of photon sieves are disposed on a second side of a substrate.

36. The imaging system according to claim 27, wherein the plurality of N photon sieves includes at least one elliptical photon sieve.

37. The imaging system according to claim 27, wherein at least one of the plurality of N photon sieves has a field of view that overlaps a field of view of another of the N photon sieves.

38. An imaging device, comprising:
a planar array of photon sieve lenses;
an array of mirrors with one lens associated with each mirror; and
wherein each mirror reflects radiation to its associated lens from a specific angle to provide a reflected field of view that is not centered on an axis perpendicular to the planar array to be captured by the lens.

39. Then imaging device according to claim 38, further comprising a detector situated at a focal plane of the array of lenses to detect images from the array of photon sieve lenses.

40. The imaging device according to claim 39, wherein the detector responds to radiation at a wavelength passed by the array of photon sieve lenses.

41. The imaging device according to claim 39, further comprising a processor receiving the output of the detector for producing a composite image from the detected images.

42. The imaging device according to claim 38, wherein the field of view of at least one lens overlaps the field of view of another of the plurality of lenses.

43. The imaging device according to claim 38, wherein the detector resides within an integrated circuit package, and wherein the array of mirrors and the array of lenses are attached to the integrated circuit package, so that the image processed by the array of mirrors and the array of lenses passes through a cover on the integrated circuit package.

44. The imaging device according to claim 38, wherein one lens has a field of view that is centered on an axis perpendicular to the planar array.

45. The imaging device according to claim 38, wherein the array of photon sieve lenses includes at least one elliptical photon sieve.

46. An imaging device, comprising:
a planar substrate;
a first photon sieve lens situated on the planar substrate;
a second photon sieve lens situated on the planar substrate;
a mirror associated with the second photon sieve lens; and
wherein the mirror reflects radiation to the second photon sieve lens from an angle that permits a field of view that is not centered on an axis perpendicular to the planar array to be imaged by the lens.

47. Then device according to claim 46, further comprising a detector situated at a focal plane of the first and second photon sieve lenses to detect images from the first and second photon sieve lenses.

48. The device according to claim 47, wherein the detector comprises a detector that responds to radiation that is passed by both the first and the second photon sieves.

49. The device according to claim 47, further comprising a processor receiving the output of the detector for producing a composite image from the detected images.

50. The device according to claim 47, wherein the detector resides within an integrated circuit package, and wherein the mm-or and the first and second photon sieve lenses are attached to the integrated circuit package, so tat the image processed by the mirrors and the first and second photon sieve lenses pass through a cover on the integrated circuit package.

51. The device according to claim 46, wherein at least one of the pinholes defining at least one of the first and second photon sieve lenses is non-circular.

52. The device according to claim 46, wherein at least one pinhole defining at least one of the first and second photon sieve lenses is suboptimal in size.

53. The device according to claim 46, wherein at least one of the first and second photon sieve lenses exhibits a narrower field of view and higher resolution compared to another of the first and second photon sieve lenses.

54. The device according to claim 46, wherein the first photon sieve lens is disposed on a first side of the substrate and the second photon sieve lens is disposed on a second side of the substrate.

55. The device according to claim 46, wherein the field of view of the first photon sieve lens overlaps the field of view of the second photon sieve lens.

56. The device according to claim 46, wherein at least one of the first and second photon sieves comprises an elliptical photon sieve.

57. An imaging device, comprising:
a planar array of photon sieve lenses;
an array of mirrors with one lens associated with each mirror;
wherein, the mirrors are arranged to form faceted concentric conic sections; and
wherein each mirror reflects radiation to its associated lens from a specific angle to permit a field of view that is not centered on an axis perpendicular to the planar array to be captured by the lens;
a detector situated at a focal plane of the array of lenses to detect images from the array of diffractive lenses.

58. The device according to claim 57, wherein the detector is situated within an integrated circuit package, and wherein the planar array of photon sieve lenses is attached to the integrated circuit package.

59. The device according to claim 57, wherein the detector detects radiation at a wavelength that is passed by the planar array of photon sieve lenses.

60. The device according to claim 57, further comprising a processor receiving the output of the detector for producing a composite image from the detected images.

61. The device according to claim 57, wherein the field of view of at least one lens overlaps the field of view of another of the array of lenses.

62. The device according to claim 57, wherein the detector resides within an integrated circuit package, and wherein the array of mirrors and the array of lenses are attached to the integrated circuit package, so that the image processed by the array of mirrors and the array of lenses passes through a cover on the integrated circuit package.

63. The device according to claim 57, wherein at least one of the pinholes of at least one of the photon sieves is non-circular.

64. The device according to claim 57, wherein at least one pinhole defining at least one of the photon sieves is suboptimal in size.

65. The device according to claim 57, wherein one of the photon sieves exhibits narrower field of view and higher resolution compared to another of the photon sieves.

66. The device according to claim 57, wherein certain of the photon sieves are disposed on a first side of the substrate and certain others of the photon sieves are disposed on a second side of the substrate.

67. The device according to claim 57, wherein the field of view of each photon sieve lens overlaps the field of view of another of the array of photon sieve lenses.

68. The device according to claim 57, wherein at least one photon sieve lens of the array of photon sieve lenses has a field of view that is centered on an axis perpendicular to the planar array of photon sieve lenses.

69. The device according to claim 57, wherein at least one photon sieve lens of the array of photon sieve lenses comprises an elliptical photon sieve.

70. An imaging device, comprising:
a planar substrate;
a plurality of pinholes forming a photon sieve disposed on the substrate;
wherein the pinholes are arranged in elliptical Fresnel zones to produce a photon sieve having a field of view that is centered off axis from an axis that is perpendicular to the planar substrate 71. The device according to claim 70, further comprising a detector that detects the radiation passed by the photon sieve.

72. The device according to claim 70, wherein at least One of pinholes is non-circular.

73. An imaging device, comprising:
a planar substrate;
a first photon sieve lens situated on the planar substrate;
a second photon sieve lens situated on the planar substrate; and
wherein at least one of the first and second photon sieves comprise an elliptical photon sieve.

74. Then device according to claim 73, further comprising a detector situated at a focal plane of the first and second photon sieve lenses to detect images from the first and second photon sieve lenses.

75. The device according to claim 74, wherein the detector detects radiation that is passed by the first and second photon sieve lenses.

76. The device according to claim 74, further comprising a processor receiving the output of the detector and combining the images from the first and second photon sieve lenses.

77. The device according to claim 73, wherein at least one pinhole defining at least one of the first and second photon sieve lenses is suboptimum in size.

78. The device according to claim 73, wherein the field of view of the first photon sieve lens overlaps the field of view of the second photon sieve lens.

79. The device according to claim 73, wherein both the first and the second photon sieves comprise elliptical photon sieves.

80. A wide angle imaging device, comprising:
a planar substrate;
an array of photon sieve lenses situated on the planar substrate; and
wherein the array of photon sieves comprises a plurality of elliptical photon sieves having overlapping fields of view to create a wider field of view than a single photon sieve.

81. Then device according to claim 80, further comprising a detector situated at a focal plane of the array of photon sieve lenses to detect images from the array of photon sieve lenses.

82. The device according to claim 81, wherein the detector detects radiation at a wavelength passed by the array of photon sieve tenses.

83. The device according to claim 81, further comprising a processor receiving the output of the detector for producing a composite image from the detected images.

84. The device according to claim 80, wherein at least one pinhole defining at least one of the photon sieve lenses is non-circular.

85. An imaging device, comprising:
an opaque planar sheet;
a plurality of pinholes defining a first photon sieve in the sheet;
a plurality of pinholes defining a second photon sieve in the sheet;
the first photon sieve exhibiting a first focal length, a first field of view, a first transmissivity, a first resolution and a first wavelength;
the second photon sieve exhibiting a second focal length, a second field of view, a second transmissivity, a second resolution and a second wavelength; and
wherein at least one of the first focal length, the first wavelength, the first transmissivity. the first resolution and the first field of view is different from the second focal length, the second wavelength, the second transmissivity, the second resolution and the second field of view.

86. The device according to claim 85, further comprising:
a first filter that passes the first wavelength filtering radiation passed by first photon sieve; and a second filter tat passes the second wavelength filtering radiation passed by the second photon sieve.

87. The device according to claim 85, further comprising:
a first detector that detects the first wavelength receiving a signal passed by the first photon sieve; and
a second detector that detects the second wavelength receiving a signal passed by the second photon sieve.

88. The device according to claim 85, wherein the first and second detectors comprise two regions of a single detector device.

89. The device according to claim 85, wherein the first and second detectors comprise a single detector that is responsive to signals at both the first and second wavelength.

90. The device according to claim 87, wherein the first detector is situated at a first focal length and wherein the second detector is situated at a second focal length.

91. The device according to claim 85, wherein at least one of pinholes is non-circular.

92. The device according to claim 85, wherein the first photon sieve exhibits narrower field of view and higher resolution compared to the second photon sieve, and wherein the second photon sieve exhibits wider field of view and lower resolution compared to the first photon sieve.

93. The device according to claim 85, wherein the first and second photon sieves comprise mono-chromatic photon sieves.

* * * * *